March 5, 1940.  H. W. PORTER ET AL  2,192,487
TIRE CHAIN TOOL
Filed June 16, 1937  2 Sheets-Sheet 1
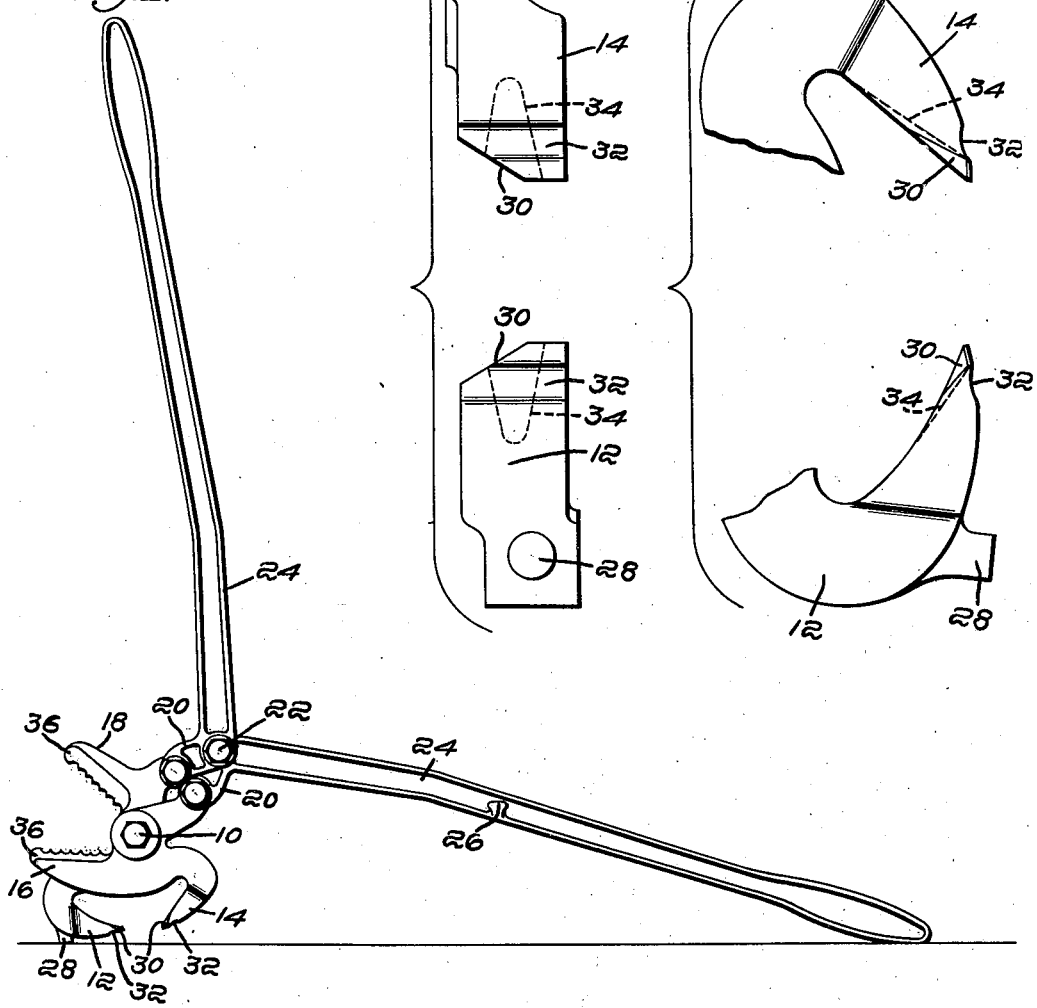
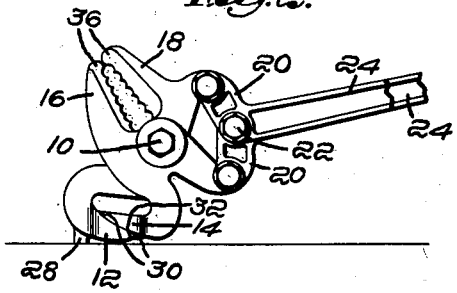
Inventors:
Henry W. Porter,
Francis T. Lind,

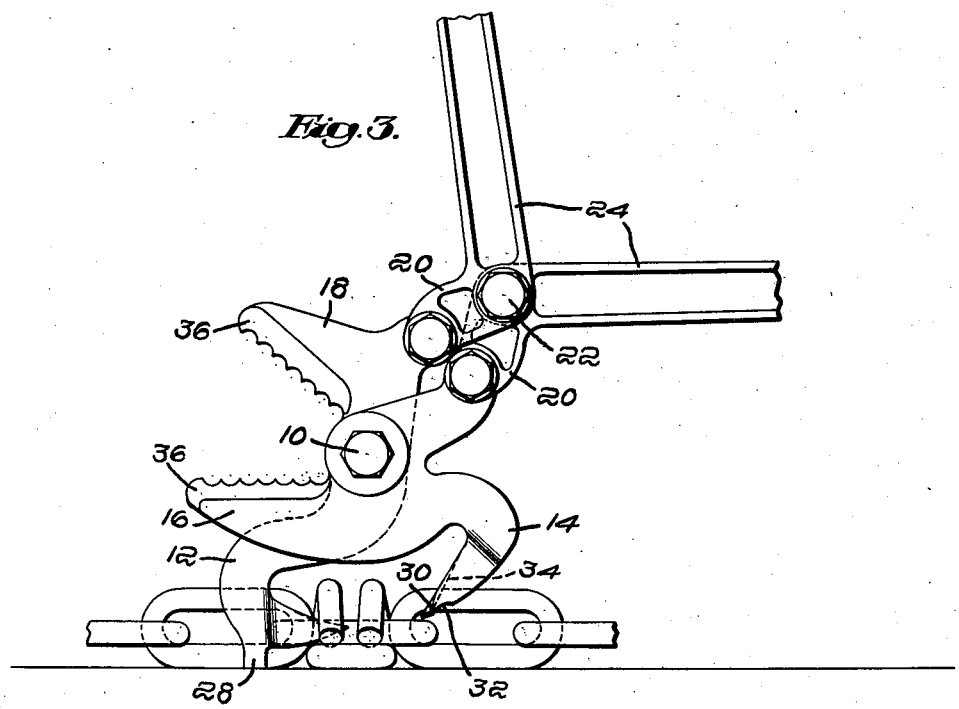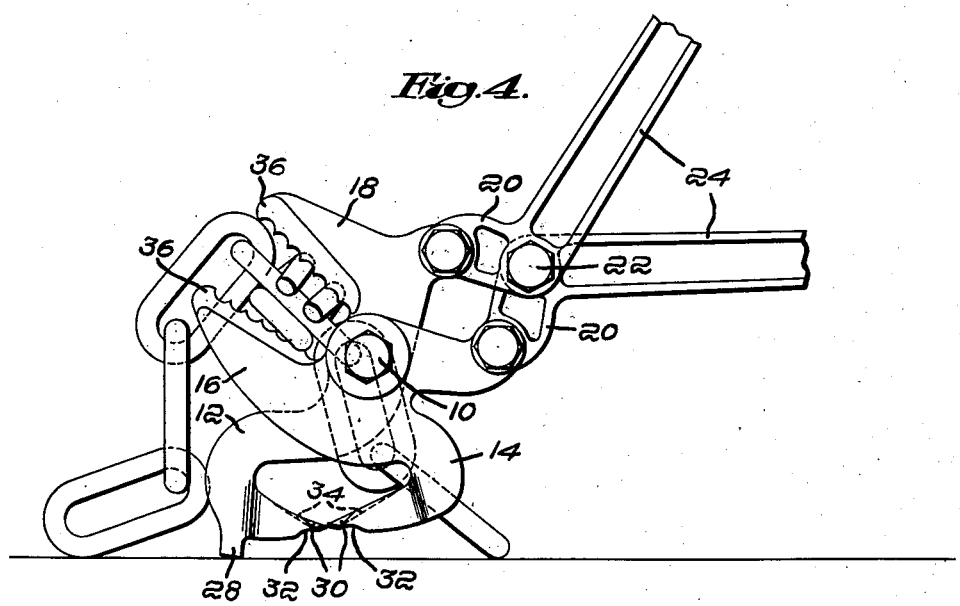

Patented Mar. 5, 1940

2,192,487

UNITED STATES PATENT OFFICE 2,192,487

TIRE CHAIN TOOL

Henry W. Porter, Brookline, and Francis T. Lind, Everett, Mass., assignors to H. K. Porter, Inc., Everett, Mass., a corporation of Massachusetts Application June 16, 1937, Serial No. 148,534

5 Claims. (Cl. 81—15)

This invention relates to tire chain tools and the object is to provide improved devices for manipulating the connecting links by means of which the cross-chains are secured to the side chains. While not limited thereto in its application, our invention meets the demand for an effective and convenient tool for handling heavy chains such as are used on large trucks.

The invention will be well understood by reference to the following description taken in connection with the accompanying drawings wherein by way of example we have shown a combination tool which may be utilized both for opening up the connecting links to release them from the side chains and for clenching open connecting links in position about the side chains. In the drawings—

Fig. 1 is a side elevation of the tool in open position;

Fig. 2 is a similar view, broken away, showing the tool in closed position;

Fig. 3 is an enlarged view of the head portion of the tool showing it in position at the beginning of a link spreading operation;

Fig. 4 is a similar view showing the tool in use to close or clench the link;

Fig. 5 is an end view on an enlarged scale of the ends of the link-opening bills; and Fig. 6 is a side view thereof.

In anti-skid chains the cross-chains which extend across the tread of the tire are ordinarily connected to the side chains by means of U-shaped links with the bights of which the cross-links are engaged and which have their arms bent over into eyes encircling a portion of the side chain. To renew a cross-chain, for example, these eyes are opened up to permit the side chain to be released. To attach a cross-chain the arms then extending in the form of open hooks are engaged about the side chain and the ends are then bent down to close the throats of the hooks sufficiently to retain the chain, forming them into eyes. The tool here disclosed as an example of our invention operates efficiently to perform both operations.

Referring to Figs. 1 and 2 of the drawings, the head of the tool comprises two interpivoted levers turning about the pivot bolt 10 and carrying respectively cooperating bills 12 and 14 for wedging open the closed eyes of a connecting link. Disposed in a location corresponding to another sector of a circle described about the center 10, the levers carry plier-like jaws 16 and 18 for clenching down the opened arms of the hooks into eye form. In a third sector are disposed the tails of the levers by which they may be operated. Herein the tool is of the compound lever type and the tails of the levers are pivoted to the short arms 20 of bell crank levers, the elbows of which are pivoted together at 22, the short arms forming a toggle extending between the tails of the head levers while the long arms 24 extend as handles for operating the same. When the handles are brought together they tend to straighten the toggle, closing the jaws toward each other with a powerful movement, as will be clear from a comparison of Figs. 1 and 2. A stop or buffer 26 may be provided on one handle to check movement of the other. While the head levers of the tool are herein connected by the single pivot 10, it will be noted that in view of the method of actuation described they are not crossed.

Particularly in the case of the heavy chains used on trucks, it is convenient to operate upon them when they are spread out on the ground in ladder-like form and at least most of the weight supported during the use of the tool thereon. The tool as herein disclosed is most convenient for use in this manner.

We will first describe the arrangement of the bills 12 and 14 which are utilized to wedge open the closed eyes of the link. The bill 12 here has the form of a rearwardly facing hook, and for a purpose which will appear, and as seen in Fig. 1, in the open position of the tool it points to a point at the distal end of the adjacent handle. As perhaps best seen in Fig. 6, the bill is in the form of a wedge tapering toward its point in the plane in which the levers pivot about the center 10 and has an inner concentric surface and an outer eccentric surface. The bill 14 is similarly tapered and has an outer concentric surface adapted to ride over the inner surface of the bill 12 and an inner eccentric surface. The two points enter the eyes of the connecting link moving from the position of Fig. 1 or Fig. 3 toward the closed position of Fig. 4 and will wedge open the eye, bending up the free ends of the link. The back of the bill 12 is formed to provide a projection or foot 28 arranged in such manner that when the tool in the open position of the parts rests upon the ground, as indicated in Fig. 1, the foot and a point at the outer end of the lower handle 24 resting upon the ground support the bill 12 spaced from the ground and extending in a generally horizontal position. With the chain spread out on the ground and the tool positioned in a vertical plane parallel to the side chain, it is thus easy to engage the end of the bill within the eye of the link ready for the opening operation, as shown in Fig. 3.

In some instances it will be found that an end of the connecting link has been forced down, enclosing the same within the U-shaped body thereof. To facilitate opening of the link in such cases the opening bills 12 and 14 may be tapered laterally. Preferably, as best seen in Figs. 5 and 6, the bills are flat on one side and in the use of the tool may find a bearing against the link of the side chain which is embraced by the connecting link. At the opposite sides they may be cut away diagonally along their inner faces, as indicated at 30. Not only is there thus provided relatively short chisel-like ends adapted to enter the restricted opening of the eyes when the ends of the link are thus "buried," but the diagonal surfaces at 30 form wedges or camming surfaces which in the initial closing movement of the tool pry out the ends while the continued movement of the main wedge surfaces to the overlapping position of Fig. 2 completes the opening of the eyes.

The cutting away of the side of the bills at 30 reduces the width of the entering ends and facilitates engagement of the tool in a loop which has been excessively restricted by flattening. We may also for this purpose relieve the back surfaces of the bills by providing shallow grooves 32 inwardly from the end thereof, thus making the entering portions thinner without objectionably reducing their strength. We may also relieve the inner faces by grooving them at 34 between their edges, the groove diminishing in width as it recedes from the edge and merging into the normal taper surface of the bill. There are thus provided relatively narrow points which may enter a restricted loop and the side of the groove provides a lateral wedge or cam for prying a "buried" link end outwardly and upwardly to permit the normal wedge surfaces of the bills to engage and act.

In closing the links the pincer-like jaws 16 and 18 are provided having clenching faces opposed throughout their length and extending substantially in radial planes although preferably not exactly so, as will be explained. With the tool disposed vertically parallel to a side chain as before, the jaws 16 and 18 may be extended transversely across the ends of the connecting link and the opposed body of the link to bend the ends down simultaneously. Referring to Fig. 1, the jaws are so positioned that in the open position of the parts as shown with the tool supported by the foot 28 and the rear end of the lower handle the upper clenching face of lower jaw 16 is disposed substantially horizontal and substantially parallel to the direction in which the bill 12 points. The connecting link may be laid on the horizontal support thus provided while most of the chain will rest upon the ground and the raised links of the side chain on the one hand and of the cross-chain on the other will substantially balance the connecting link on this surface until the jaws close to clench it in the manner indicated in Fig. 4. The jaws 16 and 18 are transversely grooved as shown with deep, nearly semi-circular recesses, the diameters of which are sufficient to accommodate the wire of the largest chain for which the tool is intended. Also, as best seen in Fig. 2, the clenching surfaces of the jaws incline inwardly toward one another as they recede from the center 10. This permits effective use of the tool with the jaws extending across the two eyes parallel to the side chains to clench them down. As is seen in Fig. 4, the recesses nearer the center joint of the tool will engage and grip one arm of the U-shaped side link so that it is retained in position between the jaws while they close and clench down the eyes. The converging arrangement of the jaws referred to, as best shown in Fig. 2, cooperates in retaining the link in position. When the jaws are opened from the position of Fig. 2, they are substantially parallel in a certain open position, and this may be chosen as a median position for the range of work for which the tool is designed so that the engagement of the jaws with the link and their pressure thereon will approximate a parallel engagement and pressure for all the various types of work to be dealt with. Thus not only is the link firmly grasped but the ejecting action which takes place with ordinary interpivoted straight jaws is minimized in effect.

The outermost ends of the gripping surfaces of the jaws 16 and 18 are preferably provided with rounded nose portions 36 of relatively great radial dimension. This permits the tool to be applied, grasping one of the arms of the connecting link immediately inwardly of such nose portion, and the rounded portion will enter between this arm and the other arm of the link and, when the tool is operated, cam or wedge the latter outwardly from between the jaws and away from the first arm. This prevents such an end of the link being bent down within the opening of the main U-shaped body of the link to be "buried" in case the tool is not fully engaged, or the tool may be deliberately applied in this manner when it is desired slightly to spread the two arms.

We are aware that the invention may be embodied in other specific forms without departing from the spirit or essential attributes thereof, and we therefore desire the present embodiment to be considered in all respects as illustrative and not restrictive; reference being had to the appended claims rather than to the foregoing description to indicate the scope of the invention.

We claim:

1. A tool for operating on tire chains comprising a pair of interpivoted head levers with handles for operating the same, one of the levers having a rearwardly turned, hooked jaw having an end formed with one surface concentric with the pivot and the other surface eccentric thereto, the two defining a wedge-shaped point, and the other lever having a wedge-shaped jaw having an end formed with one concentric surface which slides on the concentric surface of the first as the jaws are brought to closed position, and an eccentric surface, the back of the first said jaw presenting an abutment which in cooperation with a point at the extremity of the handle lever on the same side of the tool defines a line of support on which the tool may rest on the ground, the end portion of said first jaw when the opened tool is so resting extending substantially horizontally and at a clearance above the ground whereby it may readily be slid into engagement with the terminal link of a cross-chain lying spread on the ground.

2. A tool for operating on tire chains comprising a pair of interpivoted head levers with handles for operating the same, one of the levers having a rearwardly turned, hooked jaw having an end formed with one surface concentric with the pivot and the other surface eccentric thereto, the two defining a wedge-shaped point, and the other lever having a wedge-shaped jaw having an end formed with one concentric surface which slides on the concentric surface of the first as the jaws are brought to closed position, and an eccentric surface, the back of the first said jaw presenting an abutment which in cooperation with a point at the extremity of the handle lever on the same side of the tool defines a line of support on which the tool may rest on the ground, the end portion of said first jaw when the opened tool is so resting extending substantially horizontally and at a clearance above the ground whereby it may readily be slid into engagement with the terminal link of a cross-chain lying spread on the ground, the levers respectively carrying in a location corresponding to another sector of the head a pair of plier-like jaws extending substantially radially from the pivot and presenting opposed clenching faces throughout their length so located that the clenching face of the lower of the jaws, when the opened tool is supported on the ground as above described, is disposed substantially horizontally and facing upwardly.

3. A tool for operating on tire chains comprising a pair of interpivoted head levers with handles for operating the same, one of the levers having a hooked jaw having an end formed with an eccentric outer and a concentric inner surface and the other lever having a cooperating jaw having an end formed with a concentric outer surface to slide on the concentric surface of the first and an eccentric inner surface, the back of said first jaw having a projection remote from its point adapted when the tool is opened in a vertical plane to support the same with the first bill extending substantially horizontally and at a clearance above the ground whereby to facilitate sliding of the jaw into the terminal link of a side chain spread out on the ground with the tool supported at least in part by the ground.

4. A tool for operating on tire chains comprising a pair of interpivoted head levers with handles for operating the same, one of the levers having a rearwardly turned, hooked jaw having an end formed with one surface concentric with the pivot and the other surface eccentric thereto, the two defining a wedge-shaped point, and the other lever having a wedge-shaped jaw having an end formed with one concentric surface which slides on the concentric surface of the first as the jaws are brought to closed position, and an eccentric surface, the jaws being flat on one side and inwardly tapered toward their ends on the other.

5. A tool for operating on tire chains comprising a pair of interpivoted head levers with handles for operating the same, one of the levers having a rearwardly turned, hooked jaw having an end formed with one surface concentric with the pivot and the other surface eccentric thereto, the two defining a wedge-shaped point, and the other lever having a wedge-shaped jaw having an end formed with one concentric surface which slides on the concentric surface of the first as the jaws are brought to closed position, and an eccentric surface, the distal end portions of the jaws being cut away diagonally at one side of the inner faces thereof.

HENRY W. PORTER.
FRANCIS T. LIND.